United States Patent [19]

Tamura et al.

[11] Patent Number: 4,927,998
[45] Date of Patent: May 22, 1990

[54] APPARATUS FOR COOKING BY ELECTRIC HEATING INCLUDING MEANS FOR PROVIDING INTERMITTENT TEMPERATURE CONTROL THEREOF

[75] Inventors: Haruhisa Tamura; Takahiko Yamasaki, both of Nara; Mitsuhiro Hasegawa, Sakurai, all of Japan

[73] Assignee: Matsushita Electric Industrial Co., Ltd., Osaka, Japan

[21] Appl. No.: 342,679

[22] Filed: Apr. 26, 1989

Related U.S. Application Data

[63] Continuation of Ser. No. 146,646, Jan. 21, 1988, abandoned.

[30] Foreign Application Priority Data

Jan. 22, 1987 [JP] Japan ................................. 62-12897
Jan. 22, 1987 [JP] Japan ................................. 62-12898

[51] Int. Cl.$^5$ ........................................... H05B 6/68
[52] U.S. Cl. ........................... 219/494; 219/10.55 B; 219/10.55 E; 99/325
[58] Field of Search ............... 219/10.55 B, 10.55 E, 219/10.55 R, 10.55 M, 494, 497; 99/325, 326, 328, 329 R; 426/523

[56] References Cited

U.S. PATENT DOCUMENTS

| | | | |
|---|---|---|---|
| 4,309,584 | 1/1982 | Terakami | 219/10.55 B |
| 4,376,131 | 3/1983 | Mori et al. | 219/497 X |
| 4,401,884 | 8/1983 | Kusunoki et al. | 99/326 X |
| 4,481,394 | 11/1984 | Tanabe | 219/10.55 B |
| 4,553,011 | 11/1985 | Nakata et al. | 219/10.55 B |
| 4,647,746 | 3/1987 | Gke | 99/325 X |
| 4,700,052 | 10/1987 | Wolf et al. | 99/328 X |

FOREIGN PATENT DOCUMENTS

| | | |
|---|---|---|
| 24798 | 3/1981 | European Pat. Off. |
| 123970 | 11/1984 | European Pat. Off. |
| 208442 | 1/1987 | European Pat. Off. |

Primary Examiner—Philip H. Leung
Attorney, Agent, or Firm—Spencer & Frank

[57] ABSTRACT

A heating cooking apparatus utilizes a sensor of the type used in a conventional heating cooking apparatus. The change in the resistance of the sensor due to a temperature change is converted to a level representing the corresponding voltage change and this sensor level is utilized along with a level corresponding to a preset temperature of a temperature control level so selected that heat sources is turned on when the sensor level is less than this level and the heat sources is turned off when this level is exceeded so as to eliminate the occurrence of any overshooting irrespective of the presence or absence of preheating, that is, at various starting temperatures as well as in various operating conditions including one where a door is opened during the cooking and another where the cooking is interrupted due to an erroneous operation, thereby ensuring the best cooking result.

21 Claims, 6 Drawing Sheets

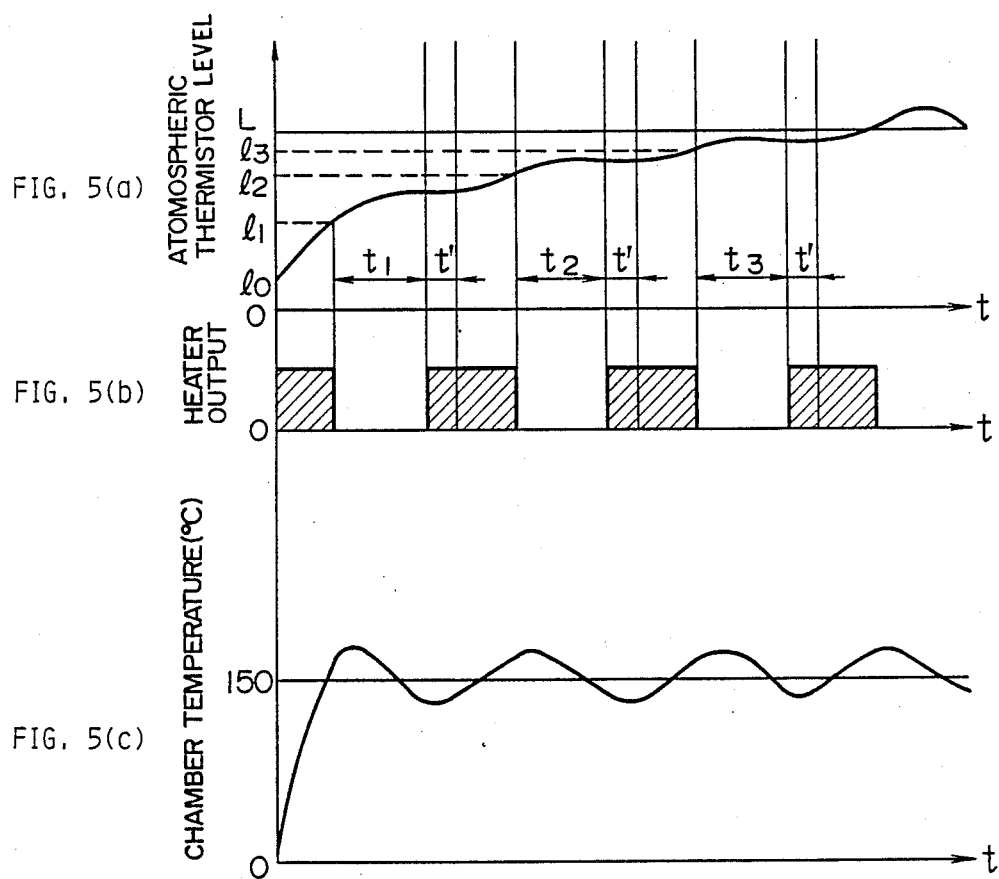

APPARATUS FOR COOKING BY ELECTRIC HEATING INCLUDING MEANS FOR PROVIDING INTERMITTENT TEMPERATURE CONTROL THEREOF

This application is a continuation of application Ser. No. 146,646, filed Jan. 21, 1988, now abandoned.

BACKGROUND OF THE INVENTION

1. Field of the Invention

The present invention relates to an apparatus for cooking by heating of the type in which a heat source is switched on and off by a microcomputer in accordance with the detected level of a cavity temperature controlling sensor. The cavity temperature is prevented from exceeding a given temperature thereby heating an object at a desired temperature, and making it possible to provide the optimum finish to prepared confections such as cakes and cookies whose temperature control is not easy.

2. Description of the Related Art

Due to the recent popularization of apparatus for cooking by electric heating such as ovens/ranges, the making in the home of confections such as cakes, cookies and chous (a cream puff) in an oven has been increasing in frequency. In addition, due to the recent liking for gourmet foods, importance has been attached to the finish of food and the speed-up of cooking time.

However, the cooking of such cakes, cookies, chous, etc., is sensitive to heating temperature and therefore there has been a tendency for their finish to be greatly deteriorated if a given baking temperature is exceeded (this phenomenon is hereinafter referred to as an overshooting). The reason is that when overshoot occurs, the food is baked at a temperature higher than its essential optimum baking temperature so that the surface of the food is baked first and its water content is not taken up, thereby cooking the food rather rare.

To prevent such overshoot, it has been the usual practice in the past to preheat the oven until the inner temperature of the heating chamber attains the desired baking temperature before an object to be heated is placed inside the heating chamber (This operation is hereinafter referred to as a preheating operation).

However, the preheating requires considerable time and also energy is wasted. In addition, there is another disadvantage that even though the preheating is effected, if the placing of the object inside the heating chamber takes time, the internal temperature of the heating chamber drops thereby causing overshoot.

As a countermeasure, a method has been proposed which eliminates the preheating to prevent any overshoot. This method is so designed that in addition to a conventional first sensor for detecting the temperature in the heating chamber to control the on-off operations of a heater, a second sensor is mounted near the heater to detect the temperature of the heater itself to compensate for the delay in the thermal response of the conventional sensor, thereby eliminating the occurrence of overshoot.

However, this construction has the following disadvantages. Firstly, the second sensor must be arranged in the vicinity of the heater and therefore it must have an excellent high temperature characteristic thus making it quite expensive. Another disadvantage is that the second sensor must be brought into complete close contact with the heater thus requiring a complicated mounting structure and deteriorating the mounting performance. Still another disadvantage is that the construction tends to be subjected to the effect of external air, the heat of a lamp for illuminating the interior of the heating chamber, etc. In addition, although having an excellent high temperature characteristic, the second sensor or thermistor is not suited for the control of the heating chamber temperature and its use along with the conventional thermistor results in an increase in cost.

SUMMARY OF THE INVENTION

In view of this background in the prior art, it is an object of the present invention to provide an improved apparatus for cooking by electric heating (hereinafter referred to simply as a heating cooking apparatus) so designed that a sensor of the type used in a conventional heating cooking apparatus is utilized in such a manner that a change in the resistance of the sensor due to a temperature change is converted to a level representing the corresponding voltage change (hereinafter referred to as a sensor level) and this sensor level is utilized along with a reference sensor level corresponding to a preset desired temperature, namely, a reference sensor level so selected that the heat source is turned on when the sensor level is less than this reference sensor level and the heat source is turned off when this reference sensor level is exceeded by the sensor level (this reference sensor level is hereinafter referred to as a temperature control level) so as to eliminate the occurrence of overshoot irrespective of the presence or absence of preheating, that is, at various starting temperatures as well as in various use conditions including one where the door is opened during the cooking and another where the cooking is interrupted due to an erroneous operation, thereby ensuring the best cooking result.

BRIEF DESCRIPTION OF THE DRAWINGS

FIGS. 5(a), 5(b) and 5(c) are time charts showing the variations in sensor level, heating chamber temperature and heat source output of the heating apparatus according to the embodiment of the invention.

DESCRIPTION OF THE PREFERRED EMBODIMENTS

Figure 1:
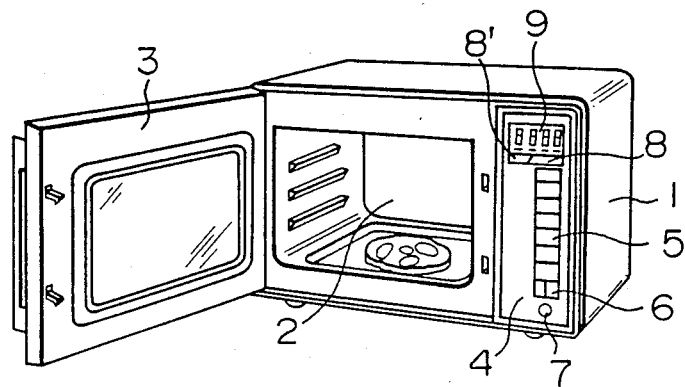
FIG. 1 is a perspective view showing the body of a heating apparatus according to an embodiment of the invention.

Referring to FIG. 1, there is illustrated a perspective view showing the body of a heating apparatus for cooking according to an embodiment of the invention. A body 1 includes a door 3 disposed to cover an opening 2 to open and close it, and a control panel 4. Arranged on the control panel 4 are input means including oven keys 5 for heating and cooking purposes, temperature setting keys 6 for setting the heating temperature, a timer control 7 for setting a heating time, a cooking start key 8, and a clear key 8' for clearing inputted data. Numeral 9 designates an indicating window for indicating the data inputted through the input means.

Figure 2:
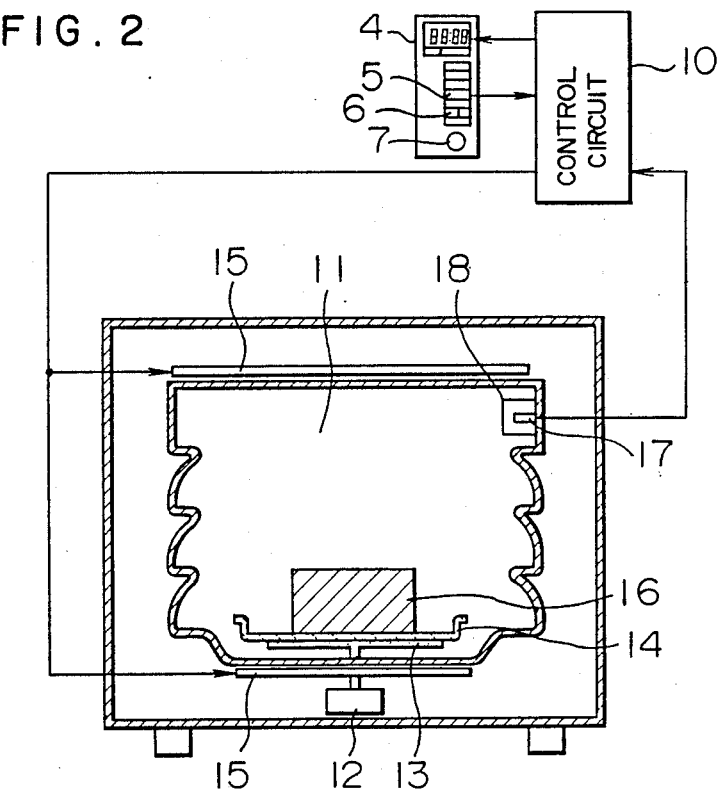
FIG. 2 is a block diagram showing a system construction of the embodiment.

Referring to FIG. 2, there is illustrated a block diagram showing a system construction of the heating cooking apparatus. The control panel 4 includes a control circuit 10 comprising a microcomputer or the like.

Numeral 11 designates a heating chamber in which a tray 14 is mounted on a turn table 13 rotated by a motor 12. A heat source including a flat heater 15 is mounted in each of the upper and lower parts of the heating chamber 11 to heat an object 16. The parameters of the heating operation to be performed on the object 16 are set by the input means on the control panel 4.

Also, an atmospheric thermistor 17 as a sensor for detecting the heating chamber temperature is arranged on one side of the heating chamber 11 so that when the chamber temperature changes, the resistance of the atmospheric thermistor 17 changes. This change is transmitted to the control circuit 10 so that when the preset temperature inputted by means of the oven keys 5 and the temperature setting keys 6 of the control panel 4 is reached, the flat heater 15 is turned on or off to control the chamber temperature at the preset temperature. The atmospheric thermistor 17 is enclosed by a cover 18 to protect it from dirt and damage.

How the formula used with the invention has been derived will now be described.

Figure 3:
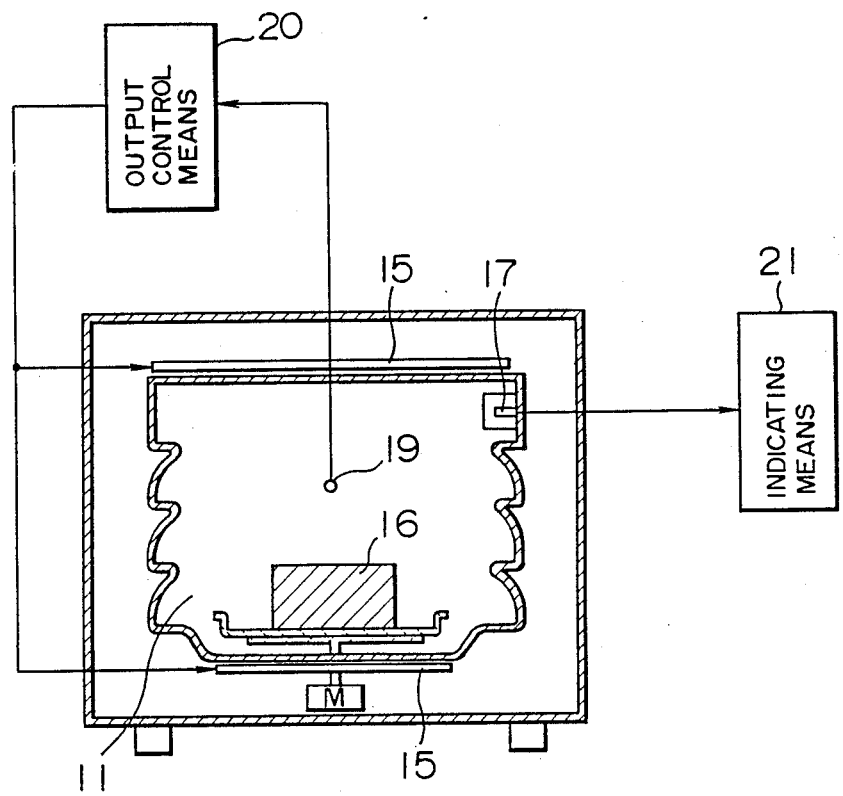
FIG. 3 is a block diagram showing a system construction used in experiments conducted to derive an expression.

Referring to FIG. 3, there is illustrated a block diagram of a heating apparatus used for conducting experiments. An object 16 to be heated is placed inside a heating chamber 11 and a thermocouple 19 is arranged in the upper part of the heating chamber 11 so as to measure the chamber temperature. In response to the temperature measured by the thermocouple 19, output control means 20 controls flat heater 15 forming a heat source. Also, a thermistor 17 always indicates a sensor level through indicating means 21.

Figure 4A:
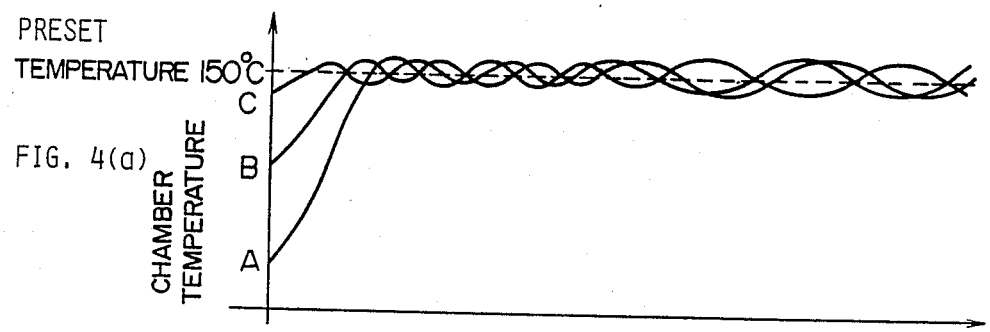
FIGS. 4(a), 4(b) and 4(c) are time charts showing the variation in sensor level, heating chamber temperature and heat source output of the system construction of FIG. 3.
Figure 4B:
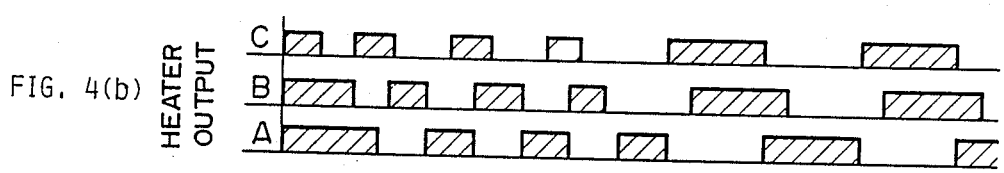
Figure 4C:
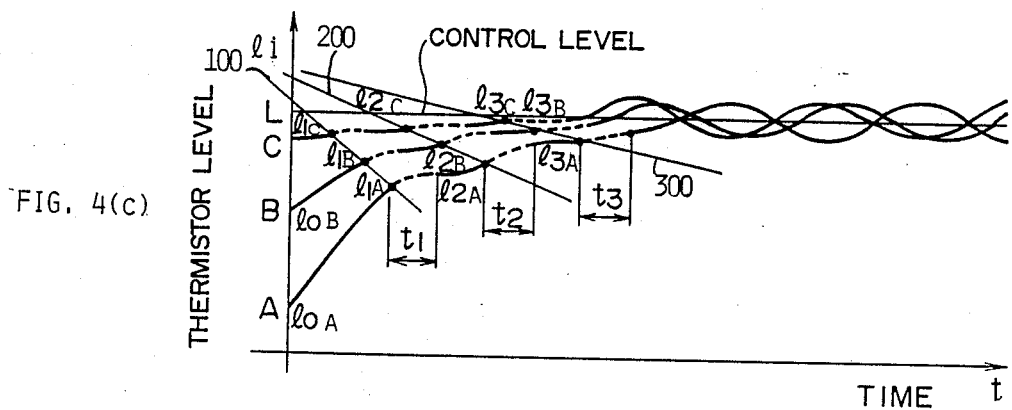

FIGS. 4(a) to 4(c) show time charts obtained when cakes were cooked with a preset temperature of 150° C. Shown in (a) FIG. 4(a) are variations with time of the chamber temperature measured by the thermocouple 19. Shown in FIG. 4(b) are variations in the output of the flat heater 15 forming a heat source. Shown in FIG. 4(c) are variations with time of the sensor level read from the indicating means 21. In these Figures, symbols A, B and C show the variations due to the differences in starting temperature within the heating chamber. The case A corresponds to the ordinary cold condition of the heating chamber 11 without any preheating and the internal temperature of the heating chamber 11 is increased in the order of the cases B and C.

Since the ambient temperature of the object 16 is measured by the thermocouple 19 to control the heating operation of the heat source as shown in FIG. 4(a), it is possible to perform an ideal control free of any overshoot irrespective of the starting temperature used. The graph of FIG. 4(c) shows the resulting sensor levels. At the broken line portions, the control level is not reached but the heat-source flat heater 15 is turned off.

Conversely, if a control is effected in such a manner that the heat-source flat heater 15 is turned off before the sensor level reaches the control level as shown FIG. 4(c), an ideal control without any overshooting can be effected as shown in FIG. 4(a). From an examination of the graph of FIG. 4(c) it will be seen that there is regularity for the sensor levels $l_i$ ($l_1$, $l_2$, $l_3$) at which the heat source is turned off. This means that if the starting temperature is varied as the cases A, B and C, the lines connecting the resulting levels $l_1$, $l_2$ and $l_3$, respectively, can each be represented by a linear function. That is, in FIG. 4(c), $l_{1A}$, $l_{1B}$ and $l_{1C}$ define a straight line 100, $l_{2A}$, $l_{2B}$, and $l_{2C}$ a straight line 200 and $l_{3A}$, $l_{3B}$, and $l_{3C}$ a straight line 300. While FIGS. 4(a) to 4(c) show the characteristic diagrams obtained in the cases where cakes were cooked, the same results can be obtained in the case of other menus such as cookies and cream puffs. Derived from this graph is an equation $l_i = l_0 + K_n \cdot (L - l_0)$, where $l_0$ = the first minimum (lowest) point (or point level) after the start of the cooking operation—and change "a constant" to—coefficients, L = the control level, $K_n$ = coefficients. In the conditions of the case A, for example, the resulting levels $l_{1A}$, $l_{2A}$ and $l_{3A}$ from the initial level $l_{0A}$ through calculation of the above equation show values which approximate the ideal value so that if the heat source is turned off for $t_1$, $t_2$ and $t_3$ seconds, respectively, when the sensor level reaches the level $l_{1A}$, $l_{2A}$ and $l_{3A}$, respectively, there results a graph without overshoot as shown in (a) FIG. 4(a). Similar experiments have been conducted for the cases B and C showing the occurrence of no overshoot like the case A. Also, with other starting temperatures than those of the cases A, B and C, the resulting levels $l_i$ ($l_1$, $l_2$, $l_3$) from the above equation $l_i = l_0 + K_n \cdot (L - l_0)$ all lie on the previously mentioned linear-function straight lines 100, 200 and 300. Note that the initial setting is made in a manner that the slope of each straight line becomes more gentle as the number of turning on-off operations increases.

In this case, while a more precise control can be effected by selecting the value of i, to have a greater value this increases the number of turn-off operations with a resulting increase in the cooking time. Although varying with different kinds of heating cooking apparatus, the experiments have shown that the best condition is obtained without increasing the cooking time when the number of repetition times N of the turning on-off operations is on the order of 3 to 5. Further, though the coefficients $K_n$ are selected depending on the kind of an object 16 to be heated which is placed in the heating chamber 11 so that in the case of automatic cooking the control can be effected with greater accuracy by using separate coefficients $K_n$ for each of the different menus, e.g., cakes, cookies and cream puffs, in the case of a heating cooking apparatus of the ordinary manual control type, satisfactory results can be obtained even if common coefficients $K_n$ used for respective cooking temperature control ranges of the menus.

Referring now to FIGS. 5(a) to 5(c), there are illustrated time charts showing the manner in which the control of the invention is effected when the preset temperature is 150° C. Shown in FIG. 5(a) is the variation of the atmospheric thermistor level with time, and shown in FIG. 5(b) is the variation in the output of the heat source. Shown in FIG. 5(c) is the variation of the chamber temperature with time.

After the cooking has been started, the control circuit 10 continuously reads the sensor level of the chamber temperature detected by the atmospheric thermistor 17. Then, the control circuit 10 stores a sensor level $l_0$ at the time when the sensor level has reached a minimum (lowest) point level to perform the calculation of $l_i = l_0 + K_n \cdot (L - l_0)$ ($n = 1, 2, 3$).

Here $l_0$ = the first minimum (lowest) sensor level after the start of the cooking operation;

L = the temperature control level of the atmospheric thermistor and $K_n$ = the coefficients selected depending on the kind of food.

In the case of this embodiment which turns the heat source off for $t_i$ seconds upon reaching the level $l_i$ determined from the equation as mentioned above, for the preset temperature of 150° C. there are set three values for $K_n$, namely $K_1=0.6$, $K_2=0.84$ and $K_3=0.99$ and the heat source or the flat heater 15 is turned off for $t_1=90$ sec, $t_2=90$ sec and $t_3=90$ sec at the levels $l_1$, $l_2$ and $l_3$, respectively.

However, at the instant that the level of the atmospheric thermistor 17 attains the temperature adjusting level L, the control is stopped immediately thereby shifting to the conventional control of the atmospheric thermistor 17.

In this case, however, if the cooking starting temperature is high in such a case as immediately after the preheating or in the case of a continuous cooking, that is, when the value of $l_0$ is close to the value of L even in the range of $l_0 < L$, the levels $l_1$, $l_2$ and $l_3$ obtained from the equation become close to one another. For instance, where $L=100$, $K_1=0.7$, $K_2=0.8$ and $K_3=0.9$, if $l_0=90$, then the resultant values $l_i$ obtained from the equation, which indicate the heat source turning-off sensor levels, are respectively expressed by $l_1=97$, $l_2=98$ and $l_3=99$. As a result the level $l_2$ is reached during the turn-off period of $t_1$ seconds at the level $l_1$ and thus the turn-off takes place continuously during the period of $(t_1+t_2)$ seconds, thereby causing an overshoot at the level $l_3$. To solve this problem, the heat source is forcibly turned on for $t'$ seconds after the off period. It has been shown by experiments that this problem can be overcome by turning the heating source on for about $t'=30$ seconds.

Figure 6:
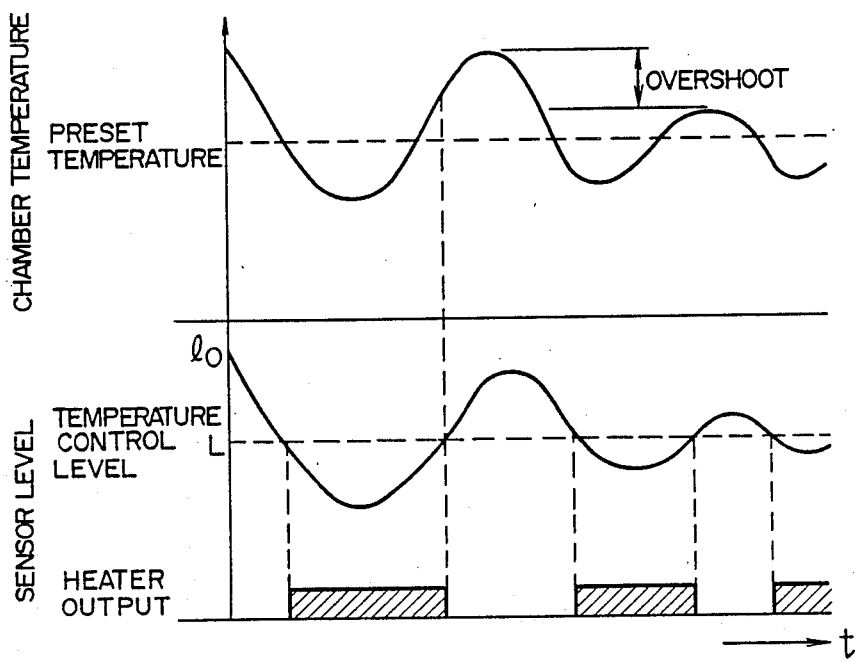
FIG. 6 is a time chart for the apparatus of FIG. 2.
Figure 7:
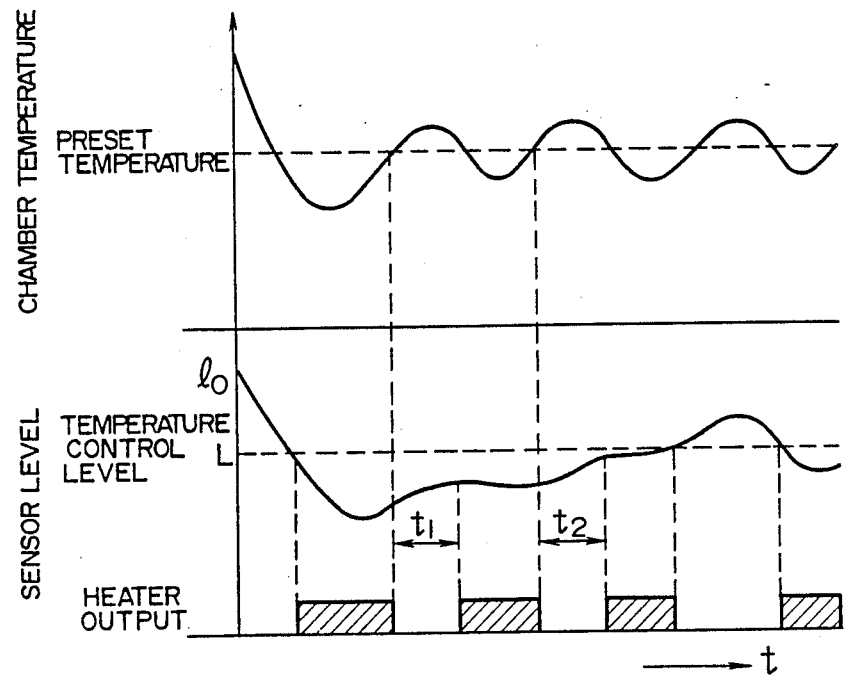
FIG. 7 is a time chart for the apparatus of FIG. 2.

Also, in the case of a continuous cooking or the like, if, for example, the second cooking temperature is lower than the first cooking temperature, there results $l_0 \geq L$ so that the sensor level is already higher than the temperature control level and the heating sources are off from the start. In such a case, if the control is stopped upon reaching the temperature control level as shown in FIG. 4(c), overshoot is caused as shown by the upper curve in FIG. 6. Thus, where $l_0 \geq L$, the occurrence of such overshooting can be prevented as shown in FIG. 7 by starting the control at the time of $l_0 < L$.

On the other hand, after the cooking has been started, if the cooking is interrupted due to the opening of the door 3 or cancellation of the heating sequence or if the preset temperature is changed by the temperature setting keys 6 of the control panel 4, thus requiring that the cooking be started again, the control in this case is not a continued operation, but it is equivalent to starting the cooking in a condition where the inner temperature of the heating chamber 11 is high. Thus, after the cooking has been restarted, first minimum point (or point level) $l_0$ is detected and the above-mentioned control is repeated.

By performing the control in this way, it is possible to eliminate the occurrence of over-shoot of the heating chamber temperature in all the cases of cooking with or without preheating, continuous cooking, cooking interruption caused by erroneous operation of the user, such as, the opening of the door 3 or the depression of the clear key 8' in the course of cooking and so on, thereby ensuring optimum finish the food.

Now considering temperature ranges in which the control is to be effected, though the control should preferably be effected in all the temperature ranges of the heating cooking apparatus, in consideration of the capacity problem of the microcomputer of the control circuit 10 and the existance of menus the finish of each of which is not much affected by the occurrence of overshoot, it is possible to decrease the microcomputer capacity by limiting the temperature control range particularly to cooking temperature range of 150° to 180° C. for such confections as cakes, cookies and cream puffs which are particularly influenced by overshoot.

While, in the described embodiment of the invention, a heating source including a flat heaters is used, the invention is equally applicable to all other heating apparatus including those employing a sheathed heater and others of the hot-air circulation type.

Figure 8:
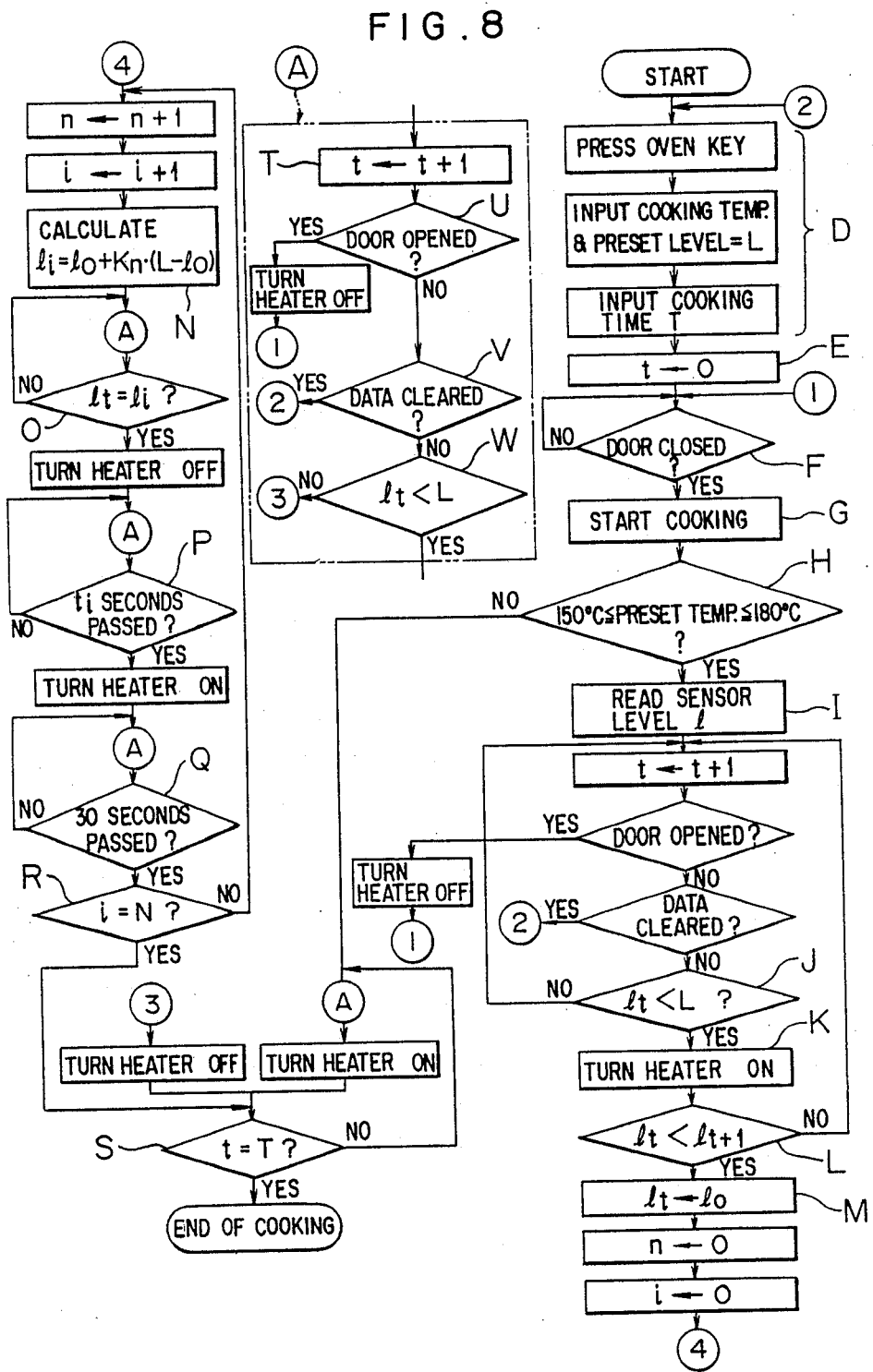
FIG. 8 is a flow chart for the apparatus of FIG. 2.

The control method according to the invention will now be described with reference to the flow chart shown in FIG. 8. A preset time T is inputted by means of the oven keys 5, the temperature setting keys 6 and the timer control 7 on the control panel 4 (step D). The time t is reset in response to the inputting of a preset time T (step E). The door 3 is closed (step F). The cooking start key is depressed to start the cooking (Step G). If the preset temperature is in the range 150° C. $\leq$ preset temperature $\leq$ 180° C., the control of the invention is started (step H). Upon starting, the sensor level 1 of the thermistor 17 is read at intervals of 1 second (step I). At the time t, if the sensor level $l_t$ which represents the value 1 read at the time t, is higher than the temperature control level L, the heaters is not turned on until $l_t < L$ results (step J). When $l_t < L$ results, the heaters is turned on (step K). The level attained after the expiration of 1 second from this time instant is compared with the preceding level (step L). If the level after the expiration of 1 second is higher than the preceding level, the preceding level is set as $l_0$ (step M). After the level $l_0$ has been detected, a level $l_i$ is computed from $l_i = l_0 + K_n \cdot (L - l_0)$ (step N). It is determined whether the level $l_i$ is reached (step O). If the level $l_t$ has reached the level $l_i$, the heaters is turned off for $t_i$ seconds (step P). At the expiration of $t_i$ seconds, the heaters is forcibly turned on for 30 seconds (step Q). This process is repeated three times. Namely, in this case N is selected to be three (step R). After the process has been repeated three times, the cooking is completed upon reaching the preset time T (step S). When the condition 150° C. $\leq$ preset temperature $\leq$ 180° C. is not satisfied, the control is effected according to the conventional method. During the control, the count-up is always effected (step T). If the door 3 is opened, the processing returns to ① (step U). If the clear key 8' is depressed, the processing returns to ② (step V). If the thermistor level becomes $l_t \geq L$, a the processing returns to ③ thereby performing the conventional control (step W). This process Ⓐ is performed at all times. However, when $l_t \geq L$ holds immediately after the start of the cooking operation, the processing does not proceed to ③.

From the foregoing description it will be seen that in accordance with the invention, due to its feature that the heat sources is turned on and off by the operation of the microcomputer by utilizing the detected levels of the chamber temperature controlling sensor, not only is the occurrence of overshoot eliminated but also the chamber temperature can be controlled as desired. For instance, it is possible to control the first half of the cooking operation at a low temperature and the latter half at a high temperature. Thus, the invention is very useful in that more sophisticated control can be ensured not only in conventional oven/ranges but also in automatic cooking apparatus and the like.

We claim:

1. A heating cooking apparatus for maintaining the temperature of a heating chamber included therein at a temperature which does not appreciably exceed a given temperature, said heating chamber being adapted to receive an object to be heated, comprising:
   a heat source for heating said heating chamber and said object;
   input means for setting the parameters of a heating operation to be performed on said object, said parameters being determined by the characteristics of the object to be heated as represented by a coefficient $K_n$, said given temperature and the amount of time during which said object is to be heated;
   a temperature sensor for detecting the temperature of said heating chamber and producing an output corresponding thereto; and
   control means coupled to said input means, said temperature sensor and said heat source for controlling the temperature of said heating chamber in accordance with the parameters of said heating operation, said control means including
   means for energizing said heat source to heat said heating chamber;
   means for performing the calculation $l_n = l_0 + K_n(L - l_0)$, where $l_0$ corresponds to the output of said temperature sensor at the approximate start of heating of said heating chamber by said heat source, L is the output of said temperature sensor corresponding to said given temperature, and n is an integer;
   means for stopping the heating of said heating chamber when the temperature sensed by said temperature sensor corresponds to the calculated value $l_n$; and
   means for restarting the heating of said temperature chamber a predetermined interval after the heating of said heating chamber has stopped.

2. A heating cooking apparatus according to claim 1 wherein the means for performing said calculation of said control means performs said calculation at least three times.

3. A heating cooking apparatus according to claim 1 wherein said control means stops the heating of said heating chamber when the output of said temperature sensor is equal to L.

4. A heating cooking apparatus according to claim 1 wherein, after said control means restarts the heating of said heating chamber, said restarted heating continues for a further predetermined interval, said further predetermined interval being such that the first and a following stop operation do not overlap each other.

5. A heating cooking apparatus according to claim 4 wherein said means for performing the calculation $l_n = l_0 + K_n(L - l_0)$ repeats said calculation after said further predetermined interval has elapsed, a new value of $l_0$ being substituted for the previous value.

6. A heating cooking apparatus according to claim 1 wherein said control means does not energize said heat source if said temperature sensor detects that the temperature of said heating chamber is equal to or greater than a temperature corresponding to L.

7. A heating cooking apparatus according to claim 1 wherein said means for performing said calculation is operative only when the given temperature set by said input means is within a predetermined temperature range.

8. The method of maintaining the temperature of a heating chamber adapted to receive an object to be heated at a temperature which does not appreciably exceed a given temperature, said heating chamber including a heat source and a temperature sensor for detecting the temperature of said heating chamber, said method comprising the steps of:
   setting the parameters of a heating operation to be performed on said object, said parameters being determined by the characteristics of the object to be heated as represented by a coefficient $K_n$, said given temperature and the amount of time during which said object is to be heated;
   energizing said heat source to heat said heating chamber;
   performing the calculation $l_n = l_0 + K_n(L - l_0)$, where $l_0$ corresponds to the output of said temperature sensor at the approximate start of heating of said heating chamber by said heat source, L is the output of said temperature sensor corresponding to said given temperature, and n is an integer;
   stopping the heating of said heating chamber when the temperature sensed by said temperature sensor corresponds to the calculated value $l_n$; and
   restarting the heating of said temperature chamber a predetermined interval after the heating of said heating chamber has stopped.

9. The method of claim 8 wherein the step of performing said calculation is repeated at least three times.

10. The method of claim 8 wherein the step of energizing said heat source is terminated when the output of said temperature sensor is equal to L.

11. The method of claim 8 wherein said step of restarting the heating of said heating chamber continues for a further predetermined interval, said further predetermined interval being such that the first and a following stop step do not overlap each other.

12. The method of claim 8 wherein said step of performing a calculation is repeated after said further predetermined interval has elapsed, a new value of $l_0$ being substituted for the previous value.

13. The method of claim 8 wherein the step of energizing said heat source is not initiated if said temperature sensor detects that the temperature of said heating chamber is equal to or greater than a temperature corresponding to L.

14. The method of claim 8 wherein said step of performing said calculation is operative only when said given temperature is within a predetermined temperature range.

15. A heating cooking apparatus comprising:
   a heating chamber for containing an object to be heated;
   heat source means for increasing the temperature in said heating chamber;
   temperature detecting means mounted on a part of said heating chamber to detect the temperature in said heating chamber;
   operation setting means for setting heating conditions; and
   control means responsive to information from said operation setting means and said temperature detecting means to control the operation of said heat source means, said control means including
   means for energizing said heat source means to heat said heating chamber;

means for performing the calculation $l_1 = l_0 + K_n(L - l_0)$, where $l_0$ corresponds to the output of said temperature detecting means at the approximate start of heating of said heating chamber by said heat source means, L is the output of said temperature detecting means corresponding to said given temperature, $K_n$ is a coefficient representing the characteristics of the object to be heated and n is an integer, $l_1$ the temperature of said heating chamber detected by said temperature detecting means at the approximate start of heating by said heat source; and means for stopping the heating of said heating chamber when the temperature sensed by said temperature detecting means corresponds to the calculated value $l_1$.

16. A heating cooking apparatus according to claim 15 wherein said control means further comprises means for restarting the heating of said temperature chamber a predetermined interval after the heating of said heating chamber has stopped, and wherein said means for performing said calculation calculates subsequent values $l_2$ and $l_3$ for values of $K_n$ equal to $K_2$ and $K_3$ respectively corresponding to temperatures which are linear functions of the temperature of said heating chamber detected by said temperature detecting means at the approximate start of heating by said heat source; and means for stopping the heating of said heating chamber when the temperatures sensed by said temperature detecting means correspond to the calculated values $l_2$ and $l_3$ respectively.

17. A heating cooking apparatus according to claim 16 wherein the slopes of straight lines representing said linear functions decrease as the value of n increases.

18. An apparatus for cooking by electric heating comprising:

a heating chamber for containing an object to be heated;

heat source means for increasing the temperature in said heating chamber from an initial heating operation starting temperature to a preset desired temperature;

temperature detecting means having detection outputs disposed at a part of said heating chamber to detect the temperature in said heating chamber;

operation condition setting means for selecting and setting heating conditions within said heating chamber, said heating conditions including, as heating condition parameters, at least one preset desired temperature and a plurality of coefficients having distinct values preset for each kind of object to be heated; and control means including a microcomputer, said control means being responsive to the heating conditions provided by said operating condition setting means and detection outputs of said temperature detecting means for controlling the operation of said heat source means to increase the temperature in said heating chamber from said initial heating operation starting temperature to said preset desired temperature, through repetition of a combination of an energization interval of time and a succeeding predetermined de-energization interval of time, respectively, of said heat source means, said repetition being continued from the start of initial energization of said heat source means, wherein said microcomputer calculates a temperature value, at which said heat source means is to be turned off at the end of the energization interval of time in the repeated combination of the energization and de-energization intervals of time, on the basis of a relational condition predetermined to exist between teh calculated heat source means turning-off temperature value and a first lowest temperature value detected by said temperature detecting means after the start of initial energization of said heat source means, said relational condition involving, as constituent elements thereof, a temperature control reference detection level for said temperature detecting means, which corresponds to said preset desired temperature, and a coefficient which is sequentially selected from said plurality of coefficients preset for each kind of object to be heated, at every repetition of the energization interval of time, whereby, as the temperature value in said heating chamber at the start of initial energization of said heat source means varies, the temperature values detected by said temperature detecting means at the respective ends of the energization intervals of time in the respective corresponding combinations of the energization and de-energization intervals of time vary along distinct straight lines, respectively, with the lapse of time of the operation of said heat source means.

19. An apparatus for cooking by electric heating according to claim 18, wherein said relational condition is represented by the following equation:

$$l_i = l_o + K_n \cdot (L - l_o)$$

where i and n denote natural numbers such as 1, 2, 3, ... ;

$l_i$ denotes the heat source means turning-off temperature values at the ends of the energization intervals of time in the repeated combination of the energization and de-energization intervals of time of said heat source means;

$l_o$ denotes the first lowest temperature value detected by said temperature detecting means after the start of initial energization of said heat source means;

L denotes the temperature control reference detection level for said temperature detecting means; and $K_n$ denotes coefficients which are sequentially selected from said plurality of coefficients preset for each kind of object to be heated, at every repetition of the energization interval of time.

20. An apparatus for cooking by electric heating according to claim 18, wherein the repetition times of the combination of the energization and de-energization intervals of time of said heat source means are three to five.

21. An apparatus for cooking by electric heating according to claim 18, wherein, each one of the straight lines, along which the temperature values detected by said temperature detecting means at the respective ends of the energization intervals of time in the respective corresponding combinations of the energization and de-energization intervals of time of said heat source means vary, as the temperature value in said heating chamber at the start of initial energization of said heat source means varies, has a slope which becomes gentler than that of a preceding one of the straight lines with the lapse of time of the operation of said heat source means.

* * * * *